R. C. ROBBINS.
Diaphragm Pressure Gage.
No. 48,877.
Patented July 18, 1865.
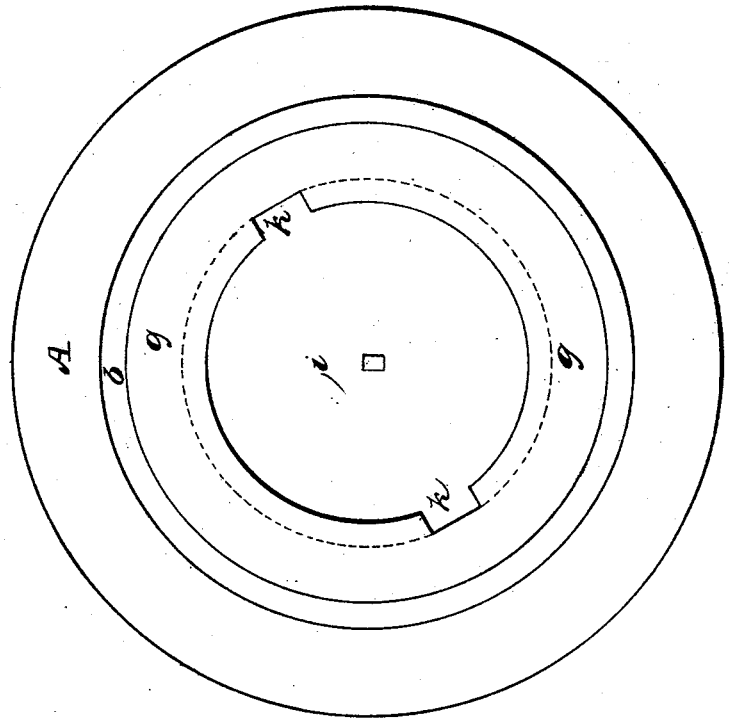
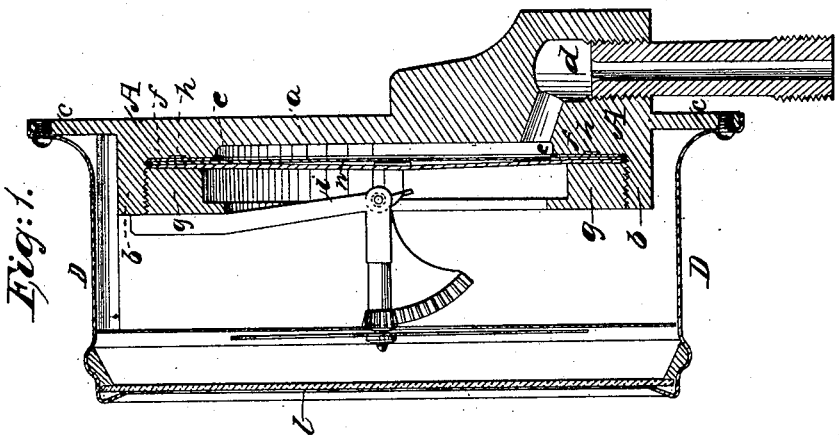
Witnesses:
J. W. Coombs
G. W. Reid
Inventor:
Richard C. Robbins

UNITED STATES PATENT OFFICE.

RICHARD C. ROBBINS, OF NEW YORK, N. Y., ASSIGNOR TO J. M. AND G. W. KEEN, OF SAME PLACE.

IMPROVED DIAPHRAGM PRESSURE-GAGE.

Specification forming part of Letters Patent No. 48,877, dated July 18, 1865.

*To all whom it may concern:*

Be it known that I, RICHARD C. ROBBINS, of the city, county, and State of New York, have invented a new and useful Improvement in Diaphragm Pressure-Gages; and I do hereby declare that the following is a full, clear, and exact description of the same, reference being had to the accompanying drawings, forming part of this specification, in which—

Figure 1 is a central section of a gage with my improvement. Fig. 2 is a front view of the same, with the dial and the mechanism which operates the index removed.

Similar letters of reference indicate corresponding parts in both figures.

My invention consists in a simplified construction of diaphragm pressure-gages, whereby much time is saved in their manufacture, and also more sensitiveness of the gage is obtained.

To enable others skilled in the art to make and use my invention, I will proceed to describe its construction and operation.

The gage represented is an improvement on a gage patented by Henry Bates, New London, Connecticut.

In the construction of the gage I provide a metallic circular piece, A, Fig. 2, of which $a$ is the bottom, with a rim, $b$, of proper thickness and height, and a flange, $c$, projecting all around the bottom $a$ and in line with it. This bottom $a$ has also a projection below the flange $c$, which has a passage, $d$, through which steam can be admitted when attached to a steam-pipe. The central part, $e$, Fig. 2, of the bottom $a$ is made lower than that part, $f$, which is next to the rim $b$. On the inner side of the rim $b$, I cut a female screw, into which I fit a ring, $g$, which has a male screw on the outside, so that they can be screwed tight together.

The part $f$ of the bottom I provide with a recess or groove, $h$. On this part $f$, I place an elastic ring, and on this I lay a plate, $n$, of non-corrosive metal, on the top of which I put a steel plate, $i$. These plates constitute the diaphragm, and are screwed down and held tight between the bottom part, $f$, and the ring $g$ by means of the rim $b$ and the ring $g$, being provided with a female and male screw, the ring $g$ having for that purpose two notches, $k$, Fig. 1.

In the gage patented by Henry Bates, of New London, Connecticut, and in other diaphragm-gages, the diaphragm is secured by means of bolts passing through the ring $a$ and through the diaphragm, near the edge of it, and are then screwed into the bottom part, $f$. It takes about twelve screws for this purpose.

In my improved gage I do away with all these screws and bolts and the holes for them, which saves a large amount of time and labor, and consequent expenses in the manufacture of them, and by having the diaphragm without holes it makes it more sensitive to the action of the steam.

To the flange $c$ the case D is attached, which, with the glass $l$, incloses the mechanism, dial, and index, all of which, with the operation of the gage, is well understood, and therefore needs no further explanation.

Having thus fully described my improvements in diaphragm pressure-gages, what I claim therein as new, and desire to secure by Letters Patent, is—

A diaphragm-holder having a female screw on one part and a male screw on the other part, by which the diaphragm is firmly secured and held in its place, thus dispensing with bolts or screws and obtaining a more sensitive diaphragm, as herein fully described and set forth.

RICHARD C. ROBBINS.

Witnesses:
J. W. COOMBS,
HENRY PALMER.